(12) United States Patent
Spangler et al.

(10) Patent No.: US 9,109,453 B2
(45) Date of Patent: Aug. 18, 2015

(54) AIRFOIL COOLING ARRANGEMENT

(75) Inventors: Brandon W. Spangler, Vernon, CT (US); Russell J. Bergman, Windsor, CT (US)

(73) Assignee: United Technologies Corporation, Hartford, CT (US)

(*) Notice: Subject to any disclaimer, the term of this patent is extended or adjusted under 35 U.S.C. 154(b) by 580 days.

(21) Appl. No.: 13/585,982

(22) Filed: Aug. 15, 2012

(65) Prior Publication Data
US 2015/0192021 A1 Jul. 9, 2015

Related U.S. Application Data

(60) Provisional application No. 61/667,123, filed on Jul. 2, 2012.

(51) Int. Cl.
*F01D 5/18* (2006.01)
*F02C 7/18* (2006.01)

(52) U.S. Cl.
CPC . *F01D 5/186* (2013.01); *F02C 7/18* (2013.01); *F05D 2260/202* (2013.01)

(58) Field of Classification Search
CPC .............. F01D 1/02; F01D 5/00; F01D 5/02; F01D 5/08; F01D 5/081; F01D 5/085; F01D 5/087; F01D 5/18; F01D 5/186; F01D 5/187; F01D 9/00; F01D 9/02; F01D 9/04; F05D 2240/12; F05D 2240/24; F05D 2260/202
See application file for complete search history.

(56) References Cited

U.S. PATENT DOCUMENTS

| | | | |
|---|---|---|---|
| 4,012,167 A | 3/1977 | Noble | |
| 4,017,213 A | 4/1977 | Przirembel | |
| 4,992,025 A | 2/1991 | Stroud et al. | |
| 5,413,458 A | 5/1995 | Calderbank | |
| 5,417,545 A | 5/1995 | Harrogate | |
| 5,470,198 A | 11/1995 | Harrogate et al. | |
| 6,241,467 B1 | 6/2001 | Zelesky et al. | |
| 6,254,333 B1 | 7/2001 | Merry | |
| 6,287,075 B1 | 9/2001 | Kercher | |
| 6,398,489 B1 | 6/2002 | Burdgick et al. | |
| 6,503,054 B1 | 1/2003 | Bielek et al. | |
| 6,554,572 B2 * | 4/2003 | Rinck et al. .................. | 416/97 R |
| 6,722,851 B1 | 4/2004 | Brittingham et al. | |
| 6,744,010 B1 | 6/2004 | Pepe et al. | |
| 6,991,430 B2 * | 1/2006 | Stec et al. .................... | 416/97 R |
| 7,004,720 B2 | 2/2006 | Synnott et al. | |
| 7,019,257 B2 | 3/2006 | Stevens | |
| 7,086,829 B2 * | 8/2006 | Fuller et al. ................... | 415/115 |
| 7,223,072 B2 | 5/2007 | Riahi et al. | |
| 7,249,934 B2 | 7/2007 | Palmer et al. | |
| 7,695,247 B1 | 4/2010 | Liang | |

(Continued)

OTHER PUBLICATIONS

The International Search Report mailed Sep. 4, 2013 for International application No. PCT/US2013/045611.

*Primary Examiner* — Edward Look
*Assistant Examiner* — Juan G Flores
(74) *Attorney, Agent, or Firm* — Kinney & Lange, P.A.

(57) ABSTRACT

An airfoil includes a leading edge, a trailing edge, a pressure side surface extending from the leading edge to the trailing edge, a suction side surface extending from the leading edge to the trailing edge and generally opposite the pressure side surface and a plurality of cooling holes. The cooling holes are positioned on the airfoil in accordance with X, Y and Z Cartesian coordinate values set forth in an accompanying Table.

11 Claims, 4 Drawing Sheets

(56) References Cited

U.S. PATENT DOCUMENTS

| | | |
|---|---|---|
| 7,806,650 B2 | 10/2010 | Heyward et al. |
| 7,921,654 B1 | 4/2011 | Liang |
| 2005/0089394 A1 | 4/2005 | Lu et al. |
| 2008/0317585 A1 | 12/2008 | Lee et al. |
| 2010/0047056 A1 | 2/2010 | Lee et al. |
| 2010/0068032 A1 | 3/2010 | Liang |
| 2011/0097191 A1 | 4/2011 | Bunker |

* cited by examiner

AIRFOIL COOLING ARRANGEMENT

CROSS-REFERENCE TO RELATED APPLICATION(S)

This application claims priority to U.S. Provisional Application No. 61/667,123, filed on Jul. 2, 2012 and entitled "AIRFOIL COOLING ARRANGEMENT".

BACKGROUND

This invention relates to cooling techniques for airfoils exposed to hot working fluid flow, including, but not limited to, rotor blade and vane airfoils.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Large-scale combustion turbines, including jet engines, are generally arranged into a number of coaxially nested spools. The spools operate at different pressures, temperatures and spool speeds, and may rotate in different directions. Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

An airfoil includes a leading edge, a trailing edge, a pressure side surface extending from the leading edge to the trailing edge, a suction side surface extending from the leading edge to the trailing edge and generally opposite the pressure side surface and a plurality of cooling holes. The cooling holes are positioned on the airfoil in accordance with X, Y and Z Cartesian coordinate values set forth in Table I.

A gas turbine engine includes a plurality of vanes, each vane extending from an inner platform to an outer platform. The vanes include an airfoil having leading and trailing edges and pressure and suction side surfaces and a plurality of cooling holes located on the airfoil. The cooling holes are positioned on the airfoil in accordance with X, Y and Z Cartesian coordinate values set forth in Table I.

DETAILED DESCRIPTION

Figure 1:
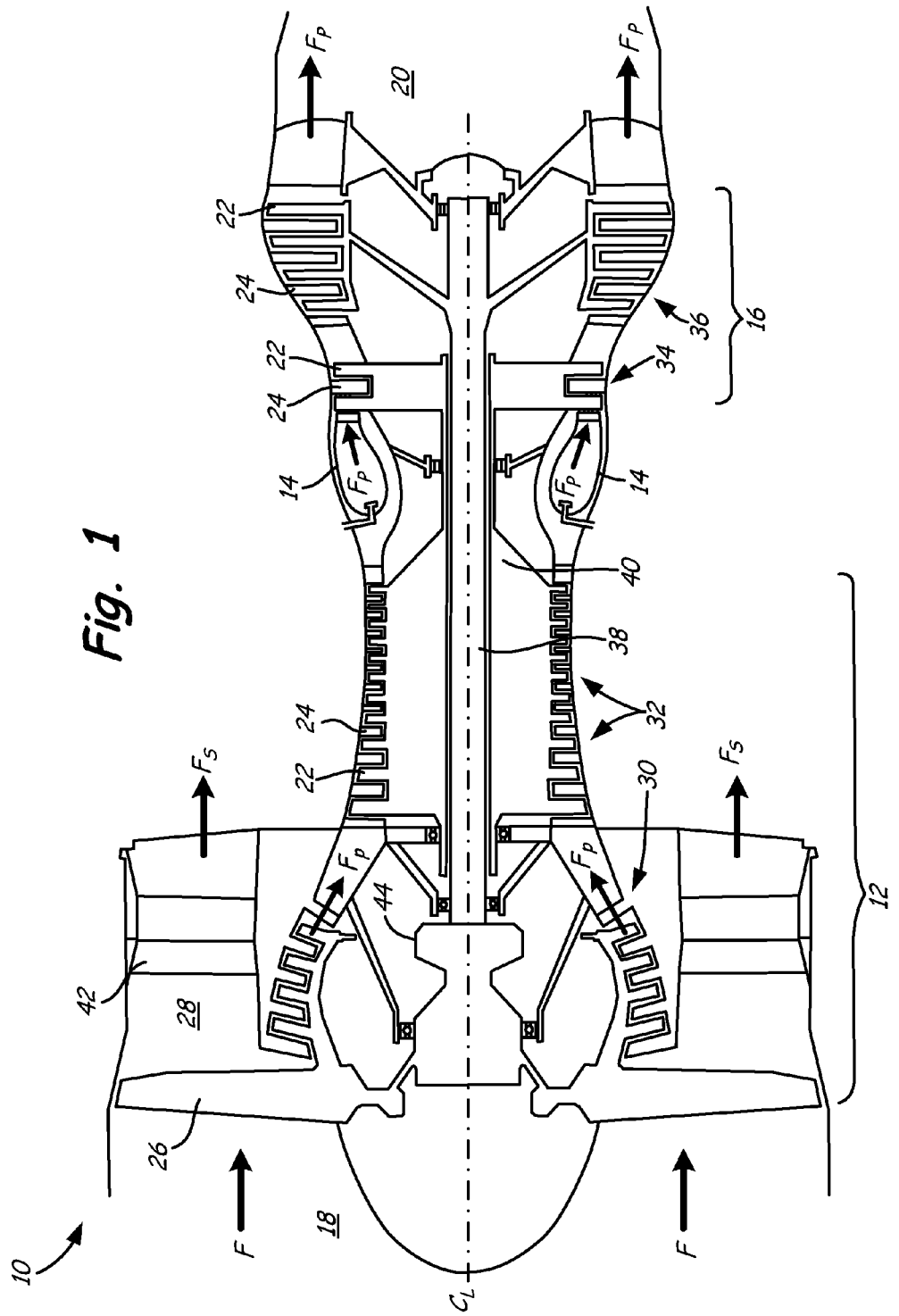
FIG. 1 is a cross-sectional view of a gas turbine engine.

FIG. 1 is a cross-sectional view of a gas turbine engine. Gas turbine engine 10 includes a power core with compressor section 12, combustor 14 and turbine section 16 arranged in flow series between upstream inlet 18 and downstream exhaust section 20. Compressor section 12 and turbine section 16 are arranged into a number of alternating stages of blades 22 and vanes 24.

In the turbofan configuration of FIG. 1, propulsion fan 26 is positioned in bypass duct 28, which is coaxially oriented about the engine core along centerline $C_L$. An open-rotor propulsion stage 26 may also be provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary flow $F_P$ and secondary (bypass) flow $F_S$ downstream of fan rotor 26. Fan rotor 26 accelerates secondary flow $F_s$ through bypass duct 28, with fan exit guide vanes (FEGVs) 42 to reduce swirl and improve thrust performance. In some designs, FEGVs 42 are structural guide vanes (SGVs), providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on blades 22, vanes 24 and other components of gas turbine engine 10. To reduce operating temperatures, increase service life and maintain engine efficiency, these components are provided with cooling configurations.

Figure 2:
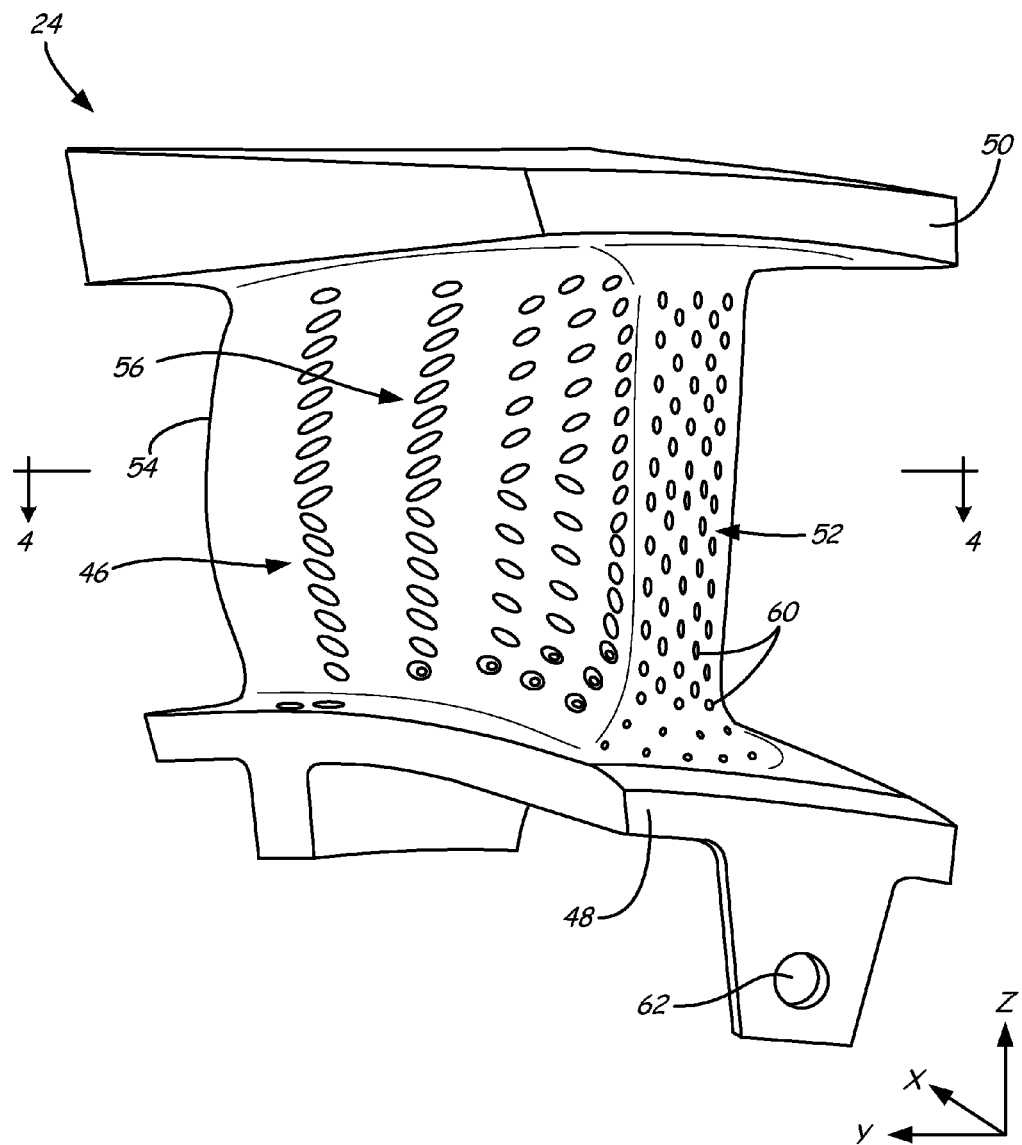
FIG. 2 is a view of one embodiment of a vane illustrating the cooling hole arrangement on the leading edge and pressure side of the airfoil.
Figure 3:
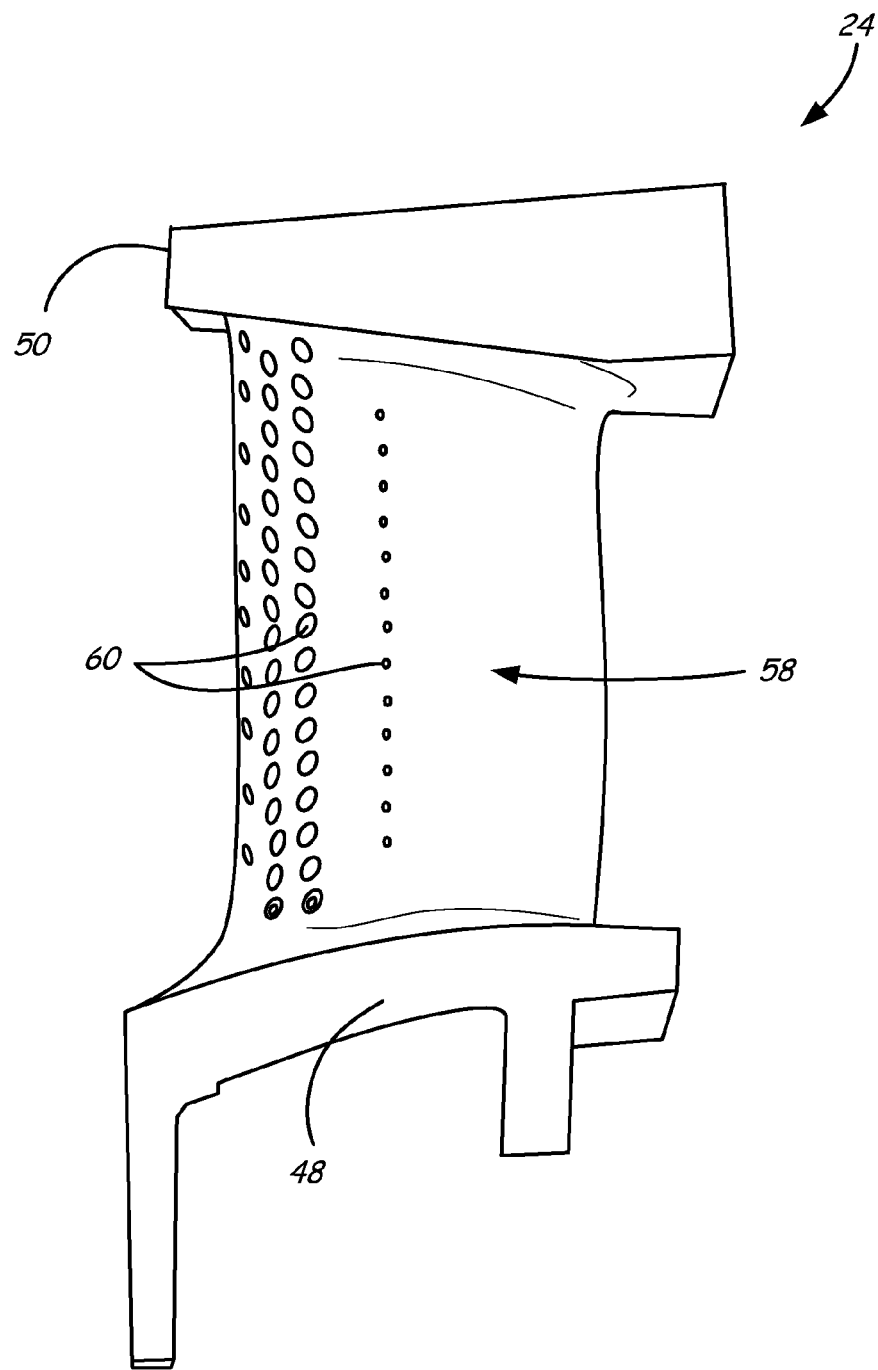
FIG. 3 is a view of the vane of FIG. 2 illustrating the cooling hole arrangement on the suction side of the airfoil.
Figure 4:
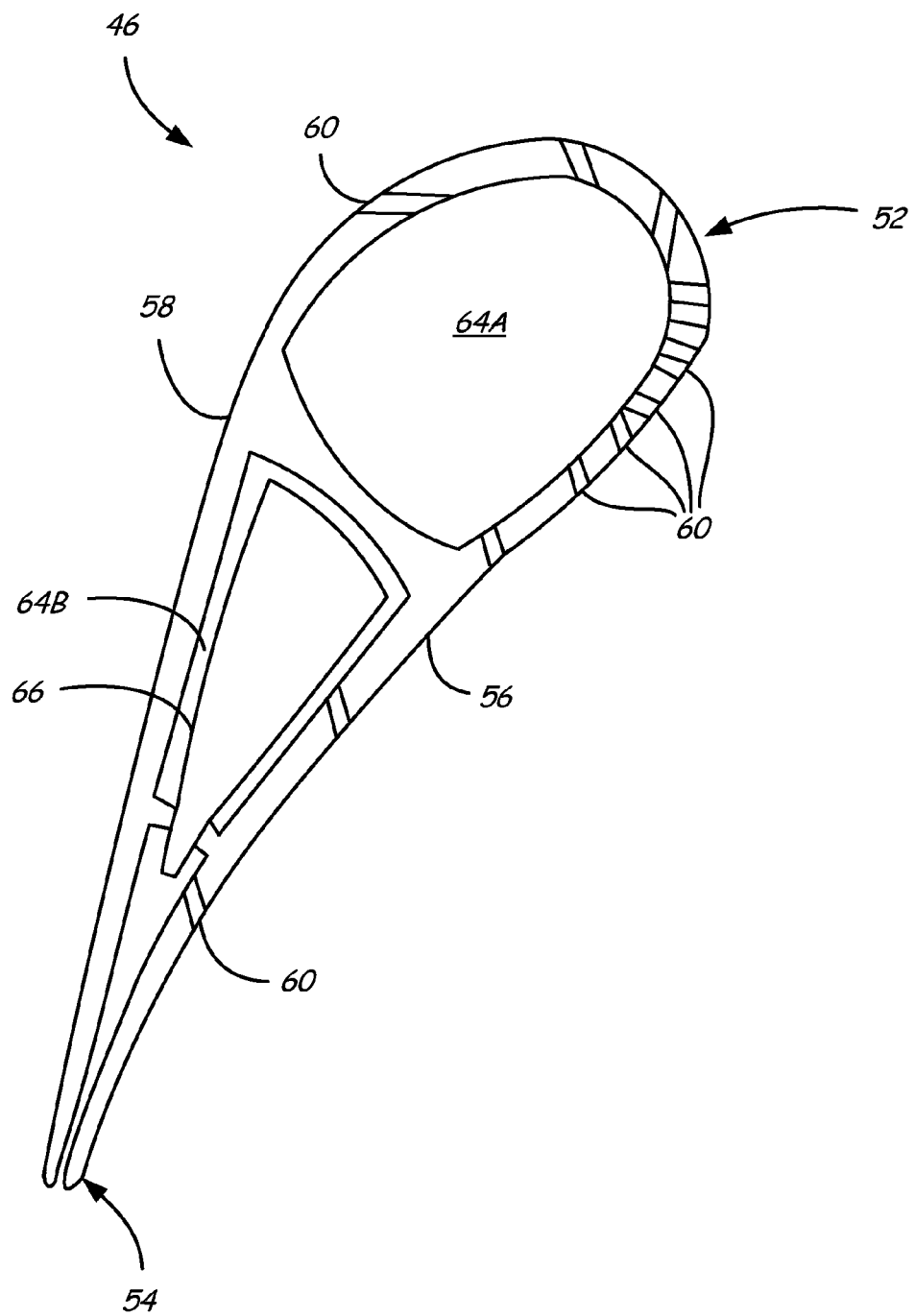
FIG. 4 is a cross section view of the vane of FIG. 2 taken along the line 4-4.

Turbine section 16 contains one or more vane stages, each stage having a plurality of vanes 24 circumferentially spaced throughout the stage, forming an annular array of vanes 24. In one embodiment, vanes 24 are located in the first stage of HPT 34. In other embodiments, vanes 24 can be located in other stages of HPT 34 or LPT 36. FIGS. 2 through 4 illustrate one embodiment of vane 24. Vane 24 includes airfoil 46, inner diameter platform 48 and outer diameter platform 50. Airfoil 46 includes leading edge 52, trailing edge 54, pressure side surface 56, suction side surface 58 and a plurality of cooling holes 60. Cooling holes 60 extend between the outer surfaces of airfoil 46 and one or more inner passages within vane 24 (shown in FIG. 4), breaking out on the outer surfaces of airfoil 46. Cooling holes 60 are located on leading edge 52, pressure side surface 56 and suction side surface 58. Cooling holes 60 can also be located along trailing edge 54. Inner diameter platform 48 includes pin hole 62, such as a tangential on-board injector (TOBI) pin hole. FIG. 2 illustrates leading edge 52, trailing edge 54 and pressure side 56 of airfoil 46. FIG. 3 illustrates suction side 58 of airfoil 46. FIG. 4 illustrates a cross section view of vane 24 taken along the line 4-4 as shown in FIG. 2. FIG. 4 shows inner passages 64 within vane 24. Inner passage 64A is located near leading edge 52 and inner passage 64B is located nearer trailing edge 54. In some embodiments, inner passages 64 include a baffle, an insert positioned within inner passage 64 to direct cooling fluid flowing through inner passage 64. As shown in FIG. 4, inner passage 64B includes baffle 66.

In some embodiments, cooling holes 60 are circular or conical. Conical cooling holes 60 have a greater diameter at the outer surface of airfoil 46 than at the inner surface of airfoil 46 adjacent inner passage 64. In other embodiments, cooling holes 60 can have other shapes. Cooling holes 60 are spaced apart along the span of airfoil 46 in multiple collinearly aligned rows for discharging cooling fluid and providing a boundary layer of film cooling fluid along the outer surface of airfoil 46.

In one embodiment of vane 24, cooling holes 60 can be described by Cartesian coordinates. FIG. 2 also shows a Cartesian coordinate system for X, Y, and Z values set forth in Table I which follows. The Cartesian coordinate system has orthogonally related X, Y, and Z axes. The X axis extends substantially parallel to centerline $C_L$ of the turbine (i.e. the rotary axis), from a platform face leading edge to a platform face trailing edge. The Y axis extends substantially perpendicular to centerline $C_L$, from a suction side platform face to a pressure side platform face. The Z axis extends radially from inner diameter platform 48 to outer diameter platform 50. By defining X and Y coordinate values at selected locations in the radial direction (i.e. in a Z direction), the cooling hole profile of the airfoil can be ascertained. The cooling hole profiles at the various surface locations between the radial distances Z can be ascertained by connecting adjacent profiles. The X and Y coordinates for determining the airfoil section profile at each radial location or airfoil height Z are tabulated in the following Table I, wherein X, Y and Z equals zero at the center of pin hole 62. These tabular values are given in inches and represent the external breakout points of the airfoil cooling hole centerlines at ambient (non-operating) conditions for an airfoil without a ceramic coating. Airfoil 46 can be at least partially covered with a coating (not shown in FIGS. 2 through 4), which may increase the dimensions of airfoil. In some embodiments, the coating protects airfoil 46 from corrosion and/or oxidation. Additionally, the sign convention used in Table I assigns a positive value to the value Z and positive and negative values for the coordinates X and Y, as typically used in a Cartesian coordinate system.

The values in Table I are computer-generated and shown to five decimal places. However, in view of manufacturing constraints, actual values useful for forming airfoil are considered valid to only three decimal places for determining the cooling hole profile of the airfoil. Moreover, typical manufacturing tolerances are accounted for in the cooling hole profile of airfoil 46. Accordingly, the values for the profile given in Table I are for a nominal airfoil. It should therefore be appreciated that typical manufacturing tolerances are applicable to the X, Y, and Z values and that an airfoil having a cooling hole profile substantially in accordance with those values includes such tolerances. The manufacturing tolerance involved in the location of each film cooling hole 60 is a diameter of approximately 0.200 inches measured on the surface of the part. In other words, due to manufacturing tolerances, the external breakout of the centerline of the hole can fall within a 0.200 inch diameter circle enscribed on the surface of the part.

TABLE I

| Hole Number | X | Y | Z |
|---|---|---|---|
| 1 | 0.23256 | 0.83401 | 0.89033 |
| 2 | 0.26296 | 0.85128 | 1.00481 |
| 3 | 0.26580 | 0.85307 | 1.13456 |
| 4 | 0.26691 | 0.85288 | 1.27140 |
| 5 | 0.26760 | 0.85278 | 1.40812 |
| 6 | 0.26809 | 0.85252 | 1.54540 |
| 7 | 0.26803 | 0.85279 | 1.64828 |
| 8 | 0.26801 | 0.85270 | 1.78418 |
| 9 | 0.26773 | 0.85264 | 1.91963 |
| 10 | 0.26803 | 0.85115 | 2.05607 |
| 11 | 0.26922 | 0.84746 | 2.20082 |
| 12 | 0.21812 | 0.92631 | 0.91300 |
| 13 | 0.23833 | 0.92922 | 1.05256 |
| 14 | 0.23866 | 0.92836 | 1.21026 |
| 15 | 0.23879 | 0.92806 | 1.34733 |
| 16 | 0.23891 | 0.92775 | 1.48447 |
| 17 | 0.23893 | 0.92779 | 1.57596 |
| 18 | 0.23894 | 0.92779 | 1.71224 |
| 19 | 0.23886 | 0.92812 | 1.87716 |
| 20 | 0.23873 | 0.92842 | 2.03101 |
| 21 | 0.23883 | 0.92723 | 2.18031 |
| 22 | 0.22199 | 1.00459 | 0.90778 |
| 23 | 0.23693 | 1.00574 | 1.05645 |
| 24 | 0.23752 | 1.00912 | 1.21286 |
| 25 | 0.23754 | 1.00890 | 1.35022 |
| 26 | 0.23753 | 1.00862 | 1.48701 |
| 27 | 0.23754 | 1.00863 | 1.57311 |
| 28 | 0.23752 | 1.00849 | 1.71078 |
| 29 | 0.23697 | 1.00495 | 1.87626 |
| 30 | 0.23665 | 1.00291 | 2.03038 |
| 31 | 0.23655 | 1.00245 | 2.17752 |
| 32 | 0.24250 | 1.09050 | 0.87494 |
| 33 | 0.25962 | 1.08142 | 1.00042 |
| 34 | 0.26034 | 1.08055 | 1.14075 |
| 35 | 0.26075 | 1.07985 | 1.27689 |
| 36 | 0.26100 | 1.07941 | 1.41316 |
| 37 | 0.26107 | 1.07903 | 1.54976 |
| 38 | 0.26118 | 1.07910 | 1.64457 |
| 39 | 0.26113 | 1.07911 | 1.78067 |
| 40 | 0.26099 | 1.07932 | 1.91659 |
| 41 | 0.26237 | 1.08286 | 2.05345 |
| 42 | 0.26503 | 1.08922 | 2.18907 |
| 43 | 0.17101 | 0.70631 | 0.76785 |
| 44 | 0.19525 | 0.77485 | 0.80918 |
| 45 | 0.10640 | 0.81643 | 0.75054 |
| 46 | 0.16110 | 0.88543 | 0.80712 |
| 47 | 0.08435 | 0.94938 | 0.73860 |
| 48 | 0.16023 | 1.01637 | 0.79505 |
| 49 | 0.10694 | 1.07709 | 0.73652 |
| 50 | 0.19816 | 1.12868 | 0.78225 |
| 51 | 0.17504 | 1.19688 | 0.73492 |
| 52 | 0.27408 | 0.74019 | 2.40229 |
| 53 | 0.28178 | 0.81146 | 2.34187 |
| 54 | 0.21199 | 0.84178 | 2.40206 |
| 55 | 0.23943 | 0.91404 | 2.32941 |
| 56 | 0.18962 | 0.96784 | 2.40069 |
| 57 | 0.23808 | 1.02243 | 2.32593 |
| 58 | 0.20320 | 1.10083 | 2.39974 |
| 59 | 0.28467 | 1.12778 | 2.32730 |
| 60 | 0.27263 | 1.20286 | 2.39421 |
| 61 | 0.96146 | 0.06303 | 0.90973 |
| 62 | 0.96356 | 0.04190 | 0.98790 |
| 63 | 0.96768 | 0.01680 | 1.07945 |
| 64 | 0.96899 | 0.00105 | 1.15846 |
| 65 | 0.97877 | −0.03059 | 1.25086 |
| 66 | 0.97876 | −0.04016 | 1.32580 |
| 67 | 0.97867 | −0.04946 | 1.41200 |
| 68 | 0.98133 | −0.06293 | 1.50446 |

TABLE I-continued

| Hole Number | X | Y | Z |
|---|---|---|---|
| 69 | 0.98374 | −0.07337 | 1.58513 |
| 70 | 0.98456 | −0.07955 | 1.67084 |
| 71 | 0.98297 | −0.07944 | 1.75206 |
| 72 | 0.98224 | −0.07955 | 1.83864 |
| 73 | 0.98016 | −0.07537 | 1.92093 |
| 74 | 0.97932 | −0.07127 | 2.00812 |
| 75 | 0.97411 | −0.05759 | 2.09278 |
| 76 | 0.97473 | −0.05136 | 2.18409 |
| 77 | 0.80327 | 0.28489 | 0.97084 |
| 78 | 0.80272 | 0.27533 | 1.05826 |
| 79 | 0.80144 | 0.26852 | 1.14341 |
| 80 | 0.80209 | 0.26014 | 1.22839 |
| 81 | 0.80189 | 0.25356 | 1.31697 |
| 82 | 0.79943 | 0.25164 | 1.39665 |
| 83 | 0.79968 | 0.24595 | 1.47936 |
| 84 | 0.79791 | 0.24370 | 1.56207 |
| 85 | 0.79743 | 0.24011 | 1.64007 |
| 86 | 0.79370 | 0.24169 | 1.71916 |
| 87 | 0.78828 | 0.24595 | 1.80155 |
| 88 | 0.78490 | 0.24729 | 1.88593 |
| 89 | 0.77652 | 0.25645 | 1.97084 |
| 90 | 0.77014 | 0.26293 | 2.05500 |
| 91 | 0.76132 | 0.27325 | 2.14148 |
| 92 | 0.75746 | 0.27690 | 2.22344 |
| 93 | 0.62149 | 0.48806 | 0.95064 |
| 94 | 0.62957 | 0.48900 | 1.09502 |
| 95 | 0.62779 | 0.48810 | 1.20724 |
| 96 | 0.62404 | 0.49019 | 1.31269 |
| 97 | 0.61964 | 0.49316 | 1.42285 |
| 98 | 0.61498 | 0.49656 | 1.52820 |
| 99 | 0.61162 | 0.49821 | 1.62848 |
| 100 | 0.60723 | 0.50047 | 1.73824 |
| 101 | 0.60187 | 0.50358 | 1.84345 |
| 102 | 0.58976 | 0.51447 | 1.95383 |
| 103 | 0.58870 | 0.51093 | 2.05886 |
| 104 | 0.58105 | 0.51521 | 2.16391 |
| 105 | 0.47681 | 0.60375 | 0.92066 |
| 106 | 0.49573 | 0.62959 | 1.03895 |
| 107 | 0.49566 | 0.63111 | 1.14854 |
| 108 | 0.49563 | 0.63244 | 1.25827 |
| 109 | 0.49519 | 0.63385 | 1.36791 |
| 110 | 0.49452 | 0.63503 | 1.47760 |
| 111 | 0.49266 | 0.63687 | 1.58723 |
| 112 | 0.48953 | 0.63935 | 1.69741 |
| 113 | 0.48586 | 0.64167 | 1.80727 |
| 114 | 0.48156 | 0.64388 | 1.91719 |
| 115 | 0.47687 | 0.64556 | 2.02707 |
| 116 | 0.47224 | 0.64628 | 2.13693 |
| 117 | 0.49124 | 0.61952 | 2.24256 |
| 118 | 0.36309 | 0.66694 | 0.88032 |
| 119 | 0.37264 | 0.72194 | 0.97510 |
| 120 | 0.35853 | 0.75091 | 1.05099 |
| 121 | 0.35698 | 0.75567 | 1.14074 |
| 122 | 0.35449 | 0.76052 | 1.22723 |
| 123 | 0.35531 | 0.76207 | 1.31233 |
| 124 | 0.35735 | 0.76203 | 1.38980 |
| 125 | 0.35741 | 0.76371 | 1.50054 |
| 126 | 0.35751 | 0.76448 | 1.58845 |
| 127 | 0.36085 | 0.76222 | 1.66853 |
| 128 | 0.36467 | 0.75916 | 1.75417 |
| 129 | 0.36506 | 0.75843 | 1.83909 |
| 130 | 0.36354 | 0.75881 | 1.92562 |
| 131 | 0.36204 | 0.75874 | 2.01239 |
| 132 | 0.36035 | 0.75844 | 2.09823 |
| 133 | 0.37346 | 0.74523 | 2.18342 |
| 134 | 0.39867 | 0.71891 | 2.26229 |
| 135 | 0.35578 | 1.19432 | 0.88104 |
| 136 | 0.35548 | 1.18985 | 0.95736 |
| 137 | 0.35522 | 1.18602 | 1.03551 |
| 138 | 0.35501 | 1.18298 | 1.11013 |
| 139 | 0.35481 | 1.18039 | 1.18788 |
| 140 | 0.35463 | 1.17831 | 1.26657 |
| 141 | 0.35448 | 1.17666 | 1.34831 |
| 142 | 0.35433 | 1.17544 | 1.42765 |
| 143 | 0.35422 | 1.17456 | 1.50976 |
| 144 | 0.35400 | 1.17390 | 1.61291 |
| 145 | 0.35391 | 1.17380 | 1.69400 |
| 146 | 0.35379 | 1.17397 | 1.77460 |

TABLE I-continued

| Hole Number | X | Y | Z |
|---|---|---|---|
| 147 | 0.35358 | 1.17436 | 1.85485 |
| 148 | 0.35325 | 1.17499 | 1.93485 |
| 149 | 0.35270 | 1.17588 | 2.01458 |
| 150 | 0.35195 | 1.17702 | 2.09407 |
| 151 | 0.35099 | 1.17837 | 2.17344 |
| 152 | 0.47660 | 1.23331 | 0.84868 |
| 153 | 0.47335 | 1.22791 | 0.92051 |
| 154 | 0.47074 | 1.22513 | 0.99844 |
| 155 | 0.46804 | 1.22260 | 1.07506 |
| 156 | 0.46670 | 1.22034 | 1.15426 |
| 157 | 0.46538 | 1.21837 | 1.23381 |
| 158 | 0.46229 | 1.21654 | 1.31150 |
| 159 | 0.46191 | 1.21520 | 1.39300 |
| 160 | 0.46072 | 1.21409 | 1.47194 |
| 161 | 0.45896 | 1.21317 | 1.55377 |
| 162 | 0.45877 | 1.21271 | 1.65184 |
| 163 | 0.45881 | 1.21265 | 1.73280 |
| 164 | 0.45857 | 1.21281 | 1.81325 |
| 165 | 0.45810 | 1.21321 | 1.89346 |
| 166 | 0.45744 | 1.21391 | 1.97337 |
| 167 | 0.45658 | 1.21491 | 2.05314 |
| 168 | 0.45538 | 1.21615 | 2.13270 |
| 169 | 0.45378 | 1.21759 | 2.21220 |
| 170 | 0.67283 | 1.13182 | 1.07519 |
| 171 | 0.67400 | 1.13195 | 1.15628 |
| 172 | 0.67496 | 1.13204 | 1.23736 |
| 173 | 0.67568 | 1.13209 | 1.31844 |
| 174 | 0.67614 | 1.13213 | 1.39953 |
| 175 | 0.67632 | 1.13215 | 1.48060 |
| 176 | 0.67616 | 1.13213 | 1.56167 |
| 177 | 0.67559 | 1.13208 | 1.64274 |
| 178 | 0.67462 | 1.13201 | 1.72381 |
| 179 | 0.67335 | 1.13188 | 1.80487 |
| 180 | 0.67173 | 1.13174 | 1.88593 |
| 181 | 0.66970 | 1.13155 | 1.96699 |
| 182 | 0.66725 | 1.13132 | 2.04803 |

In some embodiments, as shown in FIGS. 2 and 3, cooling holes 60 are oriented so that cooling fluid expelled from cooling holes 60 is directed at least partly toward a midspan region of airfoil 46 (i.e. cooling fluid is expelled away from the nearest platform, whether inner diameter platform 48 or outer diameter platform 50). Depending on location, cooling holes 60 can direct cooling fluid directly downward or upward or at an angle (i.e. downward and towards trailing edge 54). By orienting cooling holes 60 to point at least partly towards the midspan region of airfoil 46, surface temperatures in the midspan region are greatly reduced.

In other embodiments, cooling holes 60 are oriented to direct cooling fluid to a region between the midspan of airfoil 46 and inner diameter platform 48 or outer diameter platform 50. For example, in one embodiment, cooling holes 60 are positioned so that cooling holes 60 on the lower 70% of airfoil 46 direct cooling fluid at least partly towards outer diameter platform 50 and cooling holes 60 on the upper 30% of airfoil 46 direct cooling fluid at least partly towards inner diameter platform 48. In another embodiment, cooling holes 60 are positioned so that cooling holes 60 on the lower 30% of airfoil 46 direct cooling fluid at least partly towards outer diameter platform 50 and cooling holes 60 on the upper 70% of airfoil 46 direct cooling fluid at least partly towards inner diameter platform 48. In each case, cooling holes 60 direct cooling fluid towards a region between the midspan of airfoil 46 and inner diameter platform 48 or outer diameter platform 50. As above, depending on location, cooling holes 60 can direct cooling fluid directly downward or upward or at an angle (i.e. downward and towards trailing edge 54). By adjusting the region at which cooling fluid is directed on airfoil 46, the cooling fluid can be used to also cool specific components downstream of vane 24.

Discussion of Possible Embodiments

The following are non-exclusive descriptions of possible embodiments of the present invention.

An airfoil can include a leading edge, a trailing edge, a pressure side surface extending from the leading edge to the trailing edge, a suction side surface extending from the leading edge to the trailing edge and generally opposite the pressure side surface and a plurality of cooling holes. The cooling holes can be positioned on the airfoil in accordance with X, Y and Z Cartesian coordinate values set forth in Table I.

The airfoil of the preceding paragraph can optionally include, additionally and/or alternatively, any one or more of the following features, configurations and/or additional components:

In a further embodiment of the airfoil, the plurality of cooling holes can include both circular and conical holes.

In a further embodiment of any of the foregoing airfoils, the conical holes can have a maximum diameter at an outer surface of the airfoil.

In a further embodiment of any of the foregoing airfoils, the airfoil can be a component of a vane and can extend between an inner diameter platform and an outer diameter platform.

In a further embodiment of any of the foregoing airfoils, the airfoil can be located in a high pressure turbine section of a gas turbine engine.

In a further embodiment of any of the foregoing airfoils, the vane can be a first stage turbine vane.

A gas turbine engine can include a plurality of vanes, each vane extending from an inner platform to an outer platform. The vanes can include an airfoil having leading and trailing edges and pressure and suction side surfaces and a plurality of cooling holes located on the airfoil. The cooling holes can be positioned on the airfoil in accordance with X, Y and Z Cartesian coordinate values set forth in Table I.

The gas turbine engine of the preceding paragraph can optionally include, additionally and/or alternatively, any one or more of the following features, configurations and/or additional components:

In a further embodiment of the gas turbine engine, the plurality of vanes can be located in a high pressure turbine section of the gas turbine engine.

In a further embodiment of any of the foregoing gas turbine engines, the plurality of vanes can be first stage turbine vanes.

In a further embodiment of any of the foregoing gas turbine engines, the plurality of cooling holes can include both circular and conical holes.

In a further embodiment of any of the foregoing gas turbine engines, the conical holes can have a maximum diameter at an outer surface of the airfoil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil comprising:
    a leading edge;
    a trailing edge;
    a pressure side surface extending from the leading edge to the trailing edge;
    a suction side surface extending from the leading edge to the trailing edge and generally opposite the pressure side surface;
    a plurality of cooling holes positioned on the airfoil in accordance with X, Y and Z Cartesian coordinate values set forth in Table I.

2. The airfoil of claim 1, wherein the plurality of cooling holes includes both circular and conical holes.

3. The airfoil of claim 2, wherein the conical holes have a maximum diameter at an outer surface of the airfoil.

4. The airfoil of claim 1, wherein the airfoil is a component of a vane and extends between an inner diameter platform and an outer diameter platform.

5. The airfoil of claim 4, wherein the airfoil is located in a high pressure turbine section of a gas turbine engine.

6. The airfoil of claim 5, wherein the vane is a first stage turbine vane.

7. A gas turbine engine comprising:
    a plurality of vanes, each vane extending from an inner platform to an outer platform and comprising:
        an airfoil having leading and trailing edges and pressure and suction side surfaces; and
        a plurality of cooling holes located on the airfoil, wherein the plurality of cooling holes are positioned on the airfoil in accordance with X, Y and Z Cartesian coordinate values set forth in Table I.

8. The gas turbine engine of claim 7, wherein the plurality of vanes are located in a high pressure turbine section of the gas turbine engine.

9. The gas turbine engine of claim 8, wherein the plurality of vanes are first stage turbine vanes.

10. The gas turbine engine of claim 7, wherein the plurality of cooling holes includes both circular and conical holes.

11. The gas turbine engine of claim 10, wherein the conical holes have a maximum diameter at an outer surface of the airfoil.

* * * * *